(12) United States Patent
Sakai

(10) Patent No.: US 11,590,767 B2
(45) Date of Patent: Feb. 28, 2023

(54) PRINTING PROGRAM AND PRODUCING METHOD FOR PRINT

(71) Applicant: SEIKO EPSON CORPORATION, Tokyo (JP)

(72) Inventor: Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 142 days.

(21) Appl. No.: 17/323,013

(22) Filed: May 18, 2021

(65) Prior Publication Data

US 2021/0362497 A1  Nov. 25, 2021

(30) Foreign Application Priority Data

May 20, 2020 (JP) .............................. JP2020-087935

(51) Int. Cl.
*B41J 3/36* (2006.01)
(52) U.S. Cl.
CPC ....................... *B41J 3/36* (2013.01)
(58) Field of Classification Search
CPC ........................................................ B41J 3/36
See application file for complete search history.

(56) References Cited

U.S. PATENT DOCUMENTS

| | | | |
|---|---|---|---|
| 2018/0088881 A1* | 3/2018 | Kuronuma | ................ B41J 3/36 |
| 2018/0250947 A1 | 9/2018 | Nakata et al. | |
| 2018/0354257 A1 | 12/2018 | Watanabe et al. | |
| 2019/0389238 A1 | 12/2019 | Nakamura et al. | |
| 2020/0079111 A1* | 3/2020 | Shikama | ............ H04N 1/00827 |

FOREIGN PATENT DOCUMENTS

| | | |
|---|---|---|
| JP | 2018-144338 A | 9/2018 |
| JP | 2019-217732 A | 12/2019 |
| JP | 2020-040278 A | 3/2020 |

* cited by examiner

*Primary Examiner* — Justin Seo
(74) *Attorney, Agent, or Firm* — Global IP Counselors, LLP

(57) ABSTRACT

A producing method for a print by a printing system including a printing device that is manually moved with respect to a medium to perform printing on the medium, the producing method including prompting a user to designate a print plan size of a print image, printing the print image in the print plan size, and notifying a size of the print image printable in one pass by the printing device to the user before the print plan size is decided.

6 Claims, 22 Drawing Sheets

FIG. 3
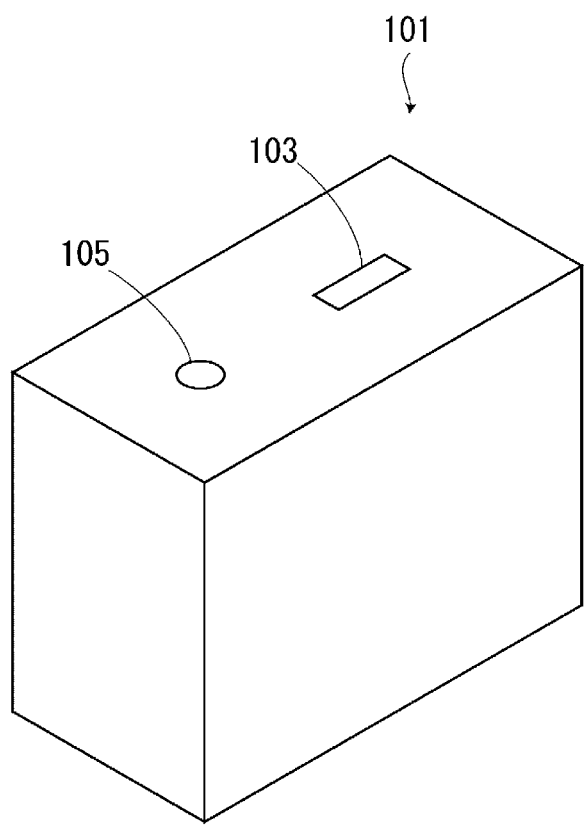
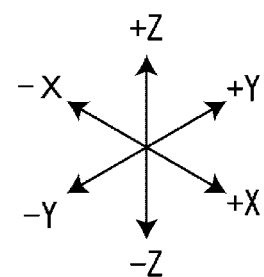

PRINTING PROGRAM AND PRODUCING METHOD FOR PRINT

The present application is based on, and claims priority from JP Application Serial Number 2020-087935, filed May 20, 2020, the disclosure of which is hereby incorporated by reference herein in its entirety.

BACKGROUND

1. Technical Field

The present disclosure relates to a printing program and a producing method for a print.

2. Related Art

As disclosed in JP-A-2018-144338 (Patent Literature 1), there has been known a handy mobile printer that is manually moved with respect to a medium to perform printing on the medium. When a print image to be printed is larger than a size printable in one pass, the handy mobile printer prints the print image separately in a plurality of passes.

When the print image is printed separately in the plurality of passes by the handy mobile printer, it is likely that streaks occur on the print image because a plurality of partial images printed in the plurality of passes overlap one another or gaps are formed among the plurality of partial images.

SUMMARY

A non-transitory computer-readable storage medium according to an aspect of the present disclosure stores a printing program that causes a computer to realize: a designating function for causing a user to designate a print plan size of a print image; an instructing function for instructing a printing device, which is manually moved with respect to a medium to perform printing on the medium, to print the print image in the designated print plan size; and a notifying function for notifying a one-pass printable size, which is a size of the print image printable in one pass by the printing device, to the user before the print plan size is designated.

A producing method for producing a print according to an aspect of the present disclosure is a producing method for producing a print by a printing system including a printing device that is manually moved with respect to a medium to perform printing on the medium, the producing method including: causing the printing system to prompt a user to designate a print plan size of a print image; causing the printing device to print the print image in the print plan size; and causing the printing system to notify a one-pass printable size, which is a size of the print image printable in one pass by the printing device, to the user before the print plan size is designated.

BRIEF DESCRIPTION OF THE DRAWINGS

FIG. 3 is a perspective view of the printing device.

DESCRIPTION OF EXEMPLARY EMBODIMENTS

Embodiments of a printing device and a producing method for a print are explained below with reference to the accompanying drawings. In the following explanation, directions in an XYZ orthogonal coordinate system shown in the figures are used. These directions are only for convenience of explanation and do not limit the embodiments explained below.

Printing System

Figure 1:
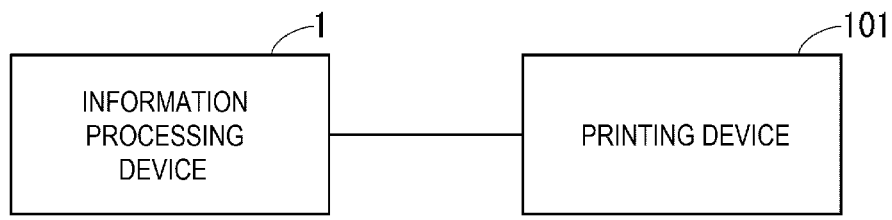
FIG. 1 is a block diagram showing a printing system.

As shown in FIG. 1, a printing system Sy includes an information processing device 1 and a printing device 101. The information processing device 1 and the printing device 101 are communicably connected by wire or radio.

The information processing device 1 transmits a printing job to the printing device 101. As the information processing device 1, for example, a smartphone, a table terminal, and a personal computer can be used.

Figure 2:
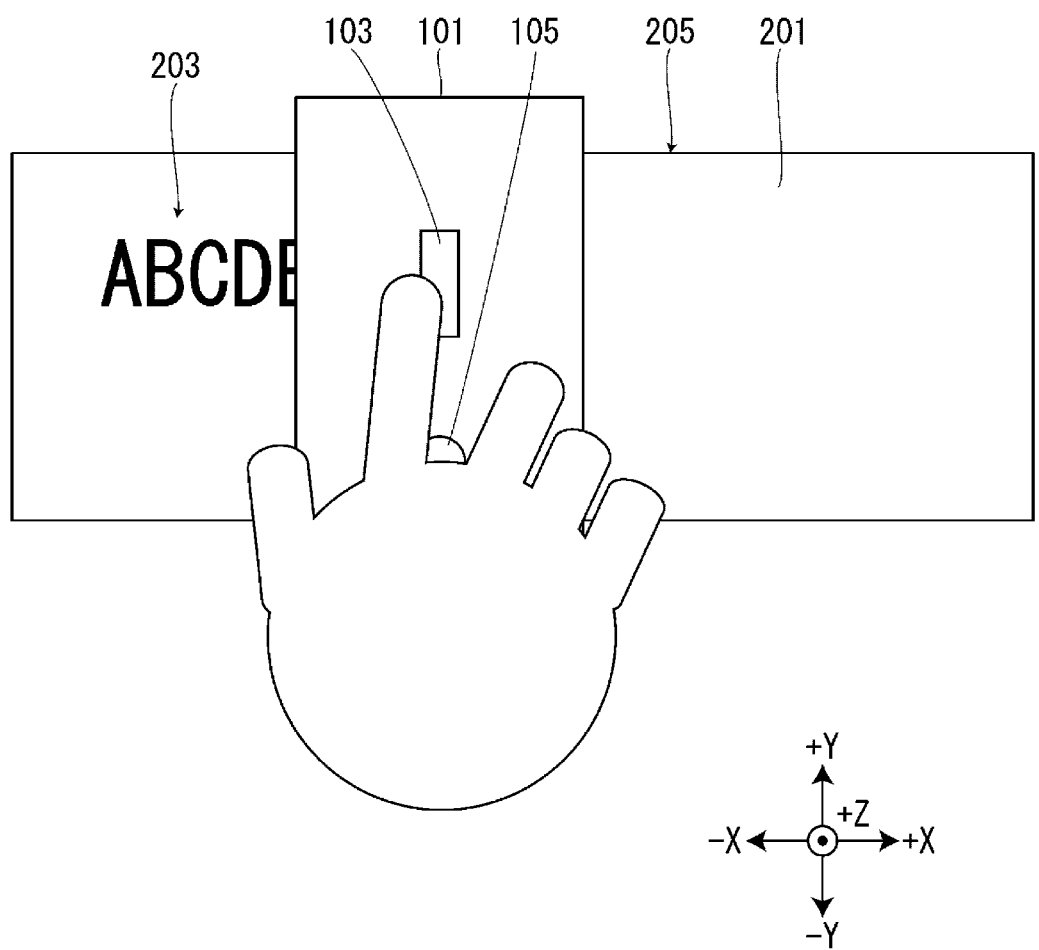
FIG. 2 is a diagram showing a print obtained by printing a print image on a medium with a printing device.

As shown in FIG. 2, the printing device 101 is a so-called handy printer. The printing device 101 is manually moved with respect to a medium 201 to print a print image 203 on the medium 201 based on the printing job received from the information processing device 1. That is, the printing device 101 produces a print 205 obtained by printing the print image 203 on the medium 201. The printing device 101 ejects, while being manually moved with respect to the medium 201, ink to the medium 201 in an inkjet scheme to print the print image 203 on the medium 201. The medium 201 is not limited to printing paper. For example, an envelope, a postcard, a business card, cardboard, a notebook, a CD (Compact Disc), and a wood slab can be used.

Printing Device

The printing device 101 is explained with reference to FIGS. 3 and 4. As shown in FIG. 3, the printing device 101 is formed in a substantially rectangular parallelepiped shape. A print button 103 and a power button 105 are provided on a surface in a +Z direction of the printing device 101. The print button 103 receives an instruction for a printing start from a user. The user can cause the printing device 101 to print the print image 203 by placing the printing device 101 on the medium 201, pressing the print button 103, and thereafter moving the gripped printing device 101 in a +X direction or a −X direction along the surface of the medium 201 (see FIG. 2). A printing operation performed while the printing device 101 is moved in the +X direction or the −X direction is referred to as "pass". The power button 105 receives an instruction for switching ON and OFF of a power supply from the user.

Figure 4:
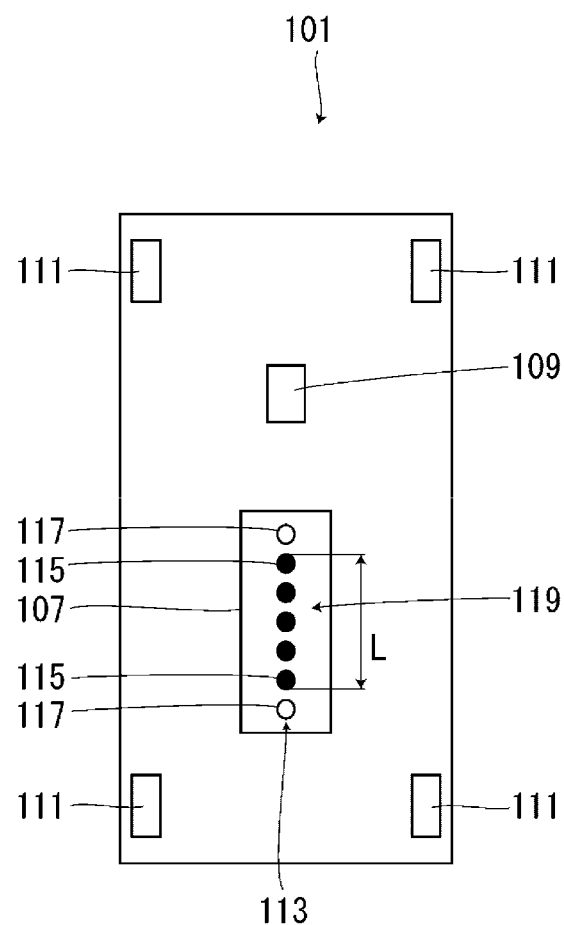
FIG. 4 is a diagram of the printing device viewed from a −Z direction.

As shown in FIG. 4, a printing head 107, a movement measuring section 109, and a plurality of rollers 111 are provided on a surface on a −Z direction of the printing device 101.

The printing head 107 is an inkjet head including a plurality of nozzles 113. The printing head 107 ejects ink from the plurality of nozzles 113 to print the print image 203 on the medium 201. The plurality of nozzles 113 are arranged in one row or a plurality of rows in a Y direction.

The movement measuring section 109 optically measures movement of the printing device 101 moved on the medium 201 by the user. Measuring movement of the printing device 101 means measuring a moving direction and a moving distance of the printing device 101. As the movement measuring section 109, a section that includes a light source such as an LED (Light Emitting Diode) and an image sensor and measures movement with respect to the medium 201 from a change in an image of the medium 201 output by the image sensor can be used.

The plurality of rollers 111 rotate in slide contact with the medium 201 to guide the movement of the printing device 101 in the +X direction or the −X direction with respect to the medium 201.

When the printing device 101 is moved with respect to the medium 201 by the user, the printing device 101 calculates relative positions of the printing device 101 and the medium 201 based on a measurement result of the movement measuring section 109. The printing device 101 ejects ink from the plurality of nozzles 113 at timing corresponding to the relative positions based on the measurement result of the movement measuring section 109. Consequently, the printing device 101 can print an image in an appropriate position of the medium 201 irrespective of speed of the movement of the printing device 101 by the user.

If "n" nozzles 113 are provided in the printing head 107, among the "n" nozzles 113, (n-a-b) nozzles 113 provided in the middle portion in the Y direction are referred to as first nozzles 115 and "a" nozzles 113 provided at the end portion in a +Y direction and "b" nozzles 113 provided at the end portion in a −Y direction are referred to as second nozzles 117. A nozzle row configured from the (n-a-b) first nozzles 115 is referred to as first nozzle row 119. The length of the first nozzle row 119 is referred to as first nozzle row length L. In FIGS. 4 to 8, the first nozzles 115 are represented by black circles and the second nozzles 117 are represented by white circles. Numerical value ranges of "n", "a", and "b" are not particularly limited. However, for example, (n-a-b) is an integer equal to or larger than 300 and equal to or smaller than 1200, "a" is an integer equal to or larger than 5 and equal to or smaller than 30, and "b" is an integer equal to or larger than 5 and equal to or smaller than 30. The numbers "a" and "b" may be the same number or may be different numbers. In FIGS. 4 to 8, for simplification of illustration, n=7, a=1, and b=1. The printing head 107 may include only the first nozzles 115 and may not include the second nozzles 117. That is, both of "a" and "b" may be 0. In this case, the first nozzle row length L is the length of a nozzle row configured from all of the "n" nozzles 113 provided in the printing head 107.

When the printing device 101 does not deviate in the +Y direction or the −Y direction, the printing head 107 ejects ink from only the first nozzles 115 of the first nozzles 115 and the second nozzles 117. A maximum size in the Y direction of the print image 203 that can be printed in one pass is substantially equal to the first nozzle row length L. That is, the printing device 101 cannot print the print image 203, a size in the Y direction of which is larger than the first nozzle row length L, in one pass. However, since the user manually moves the printing device 101, the printing device 101 sometimes deviates in the +Y direction or the −Y direction. In this case, the print image 203, the size in the Y direction of which is substantially equal to the first nozzle row length L, cannot be printed by only the first nozzles 115. Accordingly, when the printing device 101 deviates in the +Y direction or the −Y direction while being moved in the +X direction or the −X direction, the second nozzles 117 are used to compensate for the deviation. However, in a certain pass, when the printing device 101 deviates in the +Y direction or the −Y direction while being moved in the +X direction or the −X direction, first, the printing device 101 performs printing by compensating for the deviation with the second nozzles 117. However, when the printing device 101 deviates in the +Y direction or the −Y direction exceeding a range of the second nozzles 117, the printing device 101 cannot print the entire print image 203 in the pass even if the second nozzles 117 are used. In this case, the printing device 101 prints the print image 203, the size in the Y direction of which is substantially equal to the first nozzle row length L, in a plurality of passes. The description "can print in one pass" in this application means that the printing device 101 can print in one pass when the printing device 101 does not deviate in the +Y direction or the −Y direction and does not means that the printing device 101 always prints in one pass. "Can print in one pass" is an expression indicating that the printing device 101 is allowed to print in a plurality of passes when the printing device 101 greatly deviates in the +Y direction or the −Y direction.

The Number of Passes and the Print Image

Figure 5:
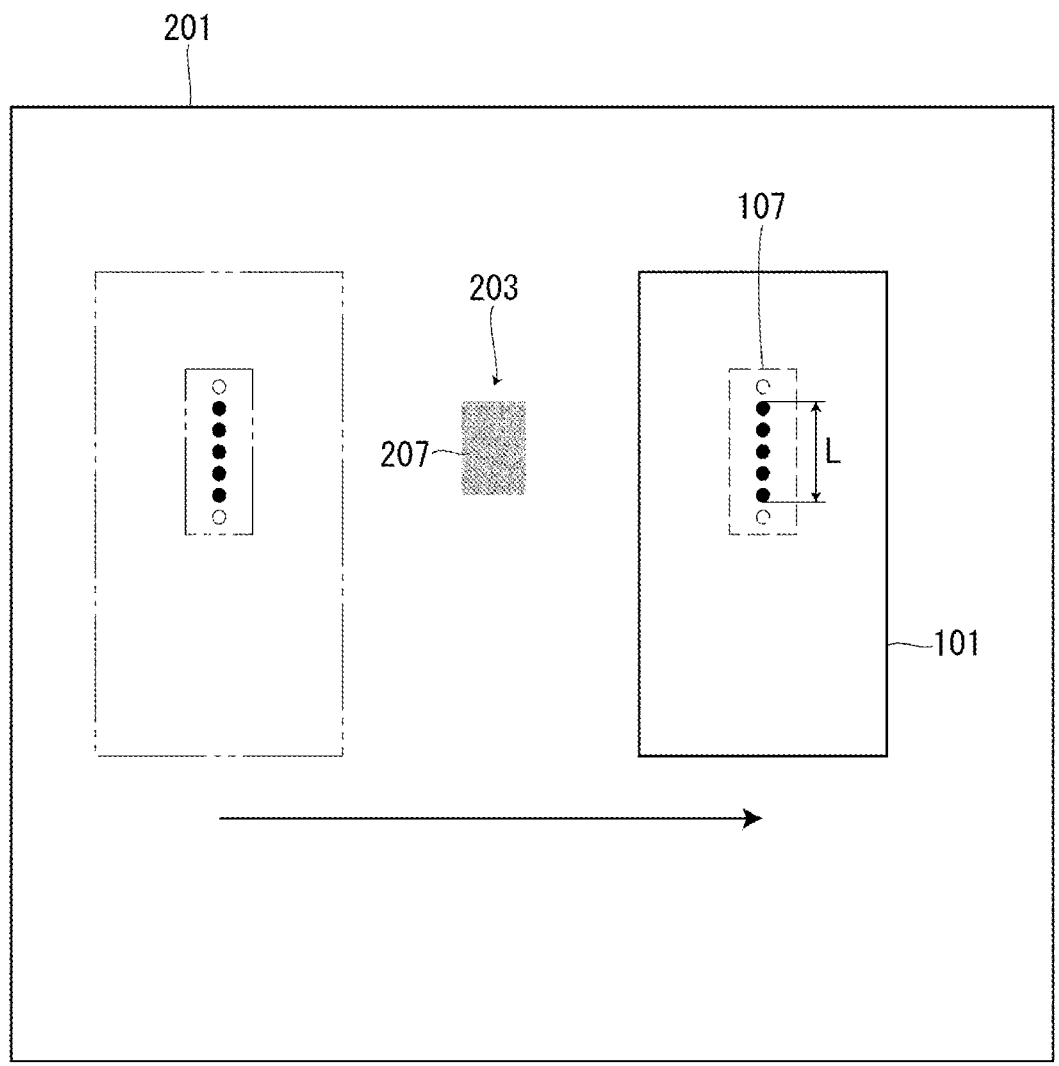
FIG. 5 is a diagram showing a state in which a first pass is performed when the printing device prints the print image separately in three passes.
Figure 6:
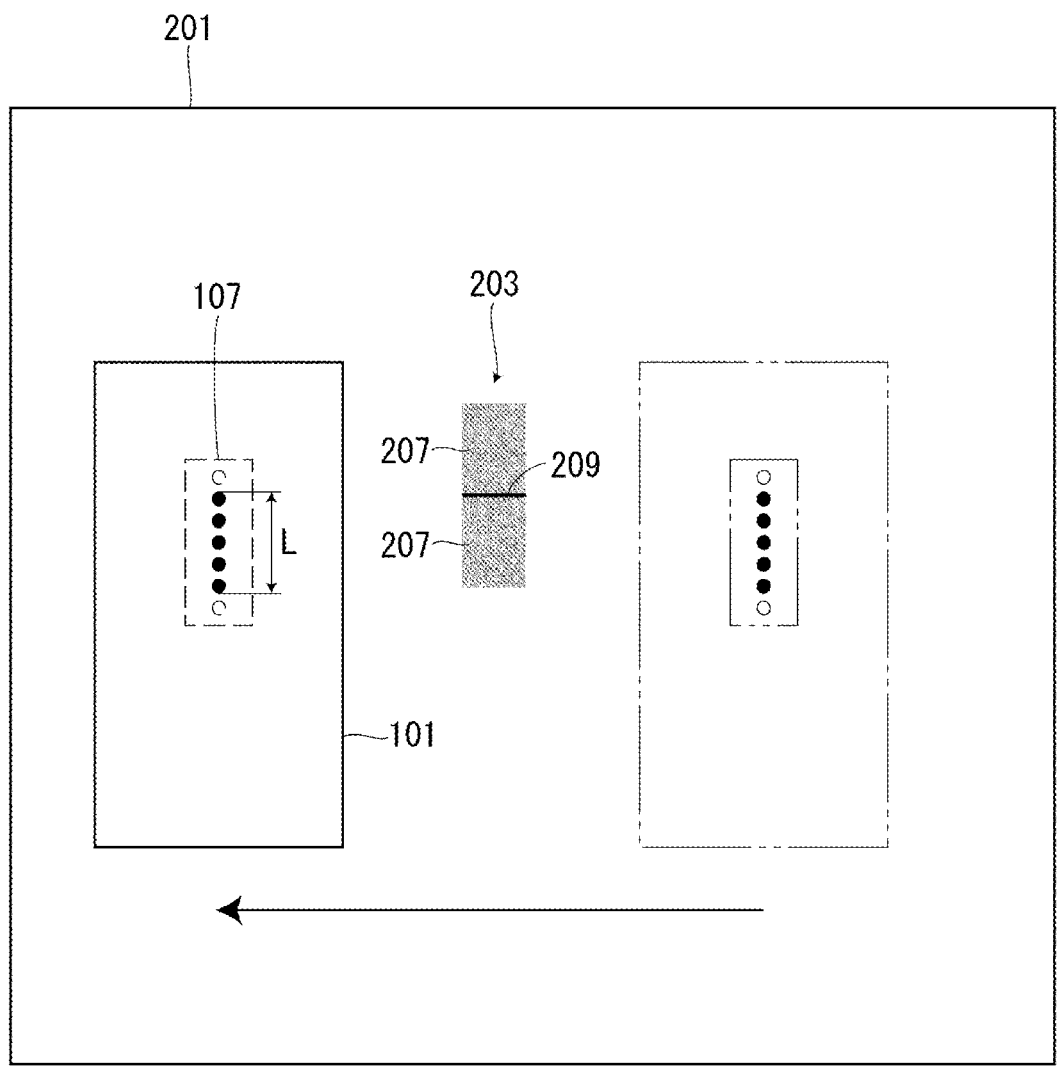
FIG. 6 is a diagram showing a state in which a second pass is performed when the printing device prints the print image separately in the three passes.
Figure 7:
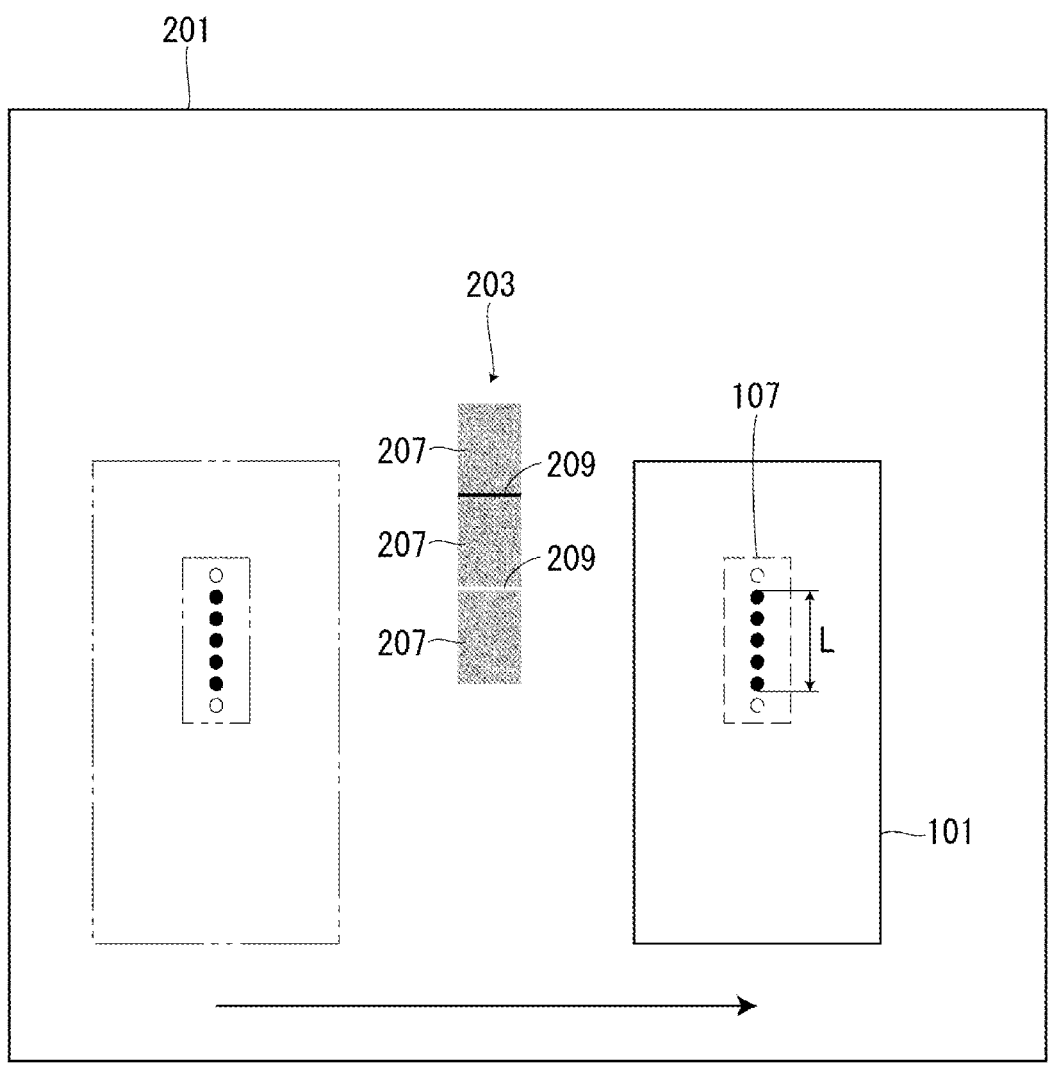
FIG. 7 is a diagram showing a state in which a third pass is performed when the printing device prints the print image separately in the three passes.
Figure 8:
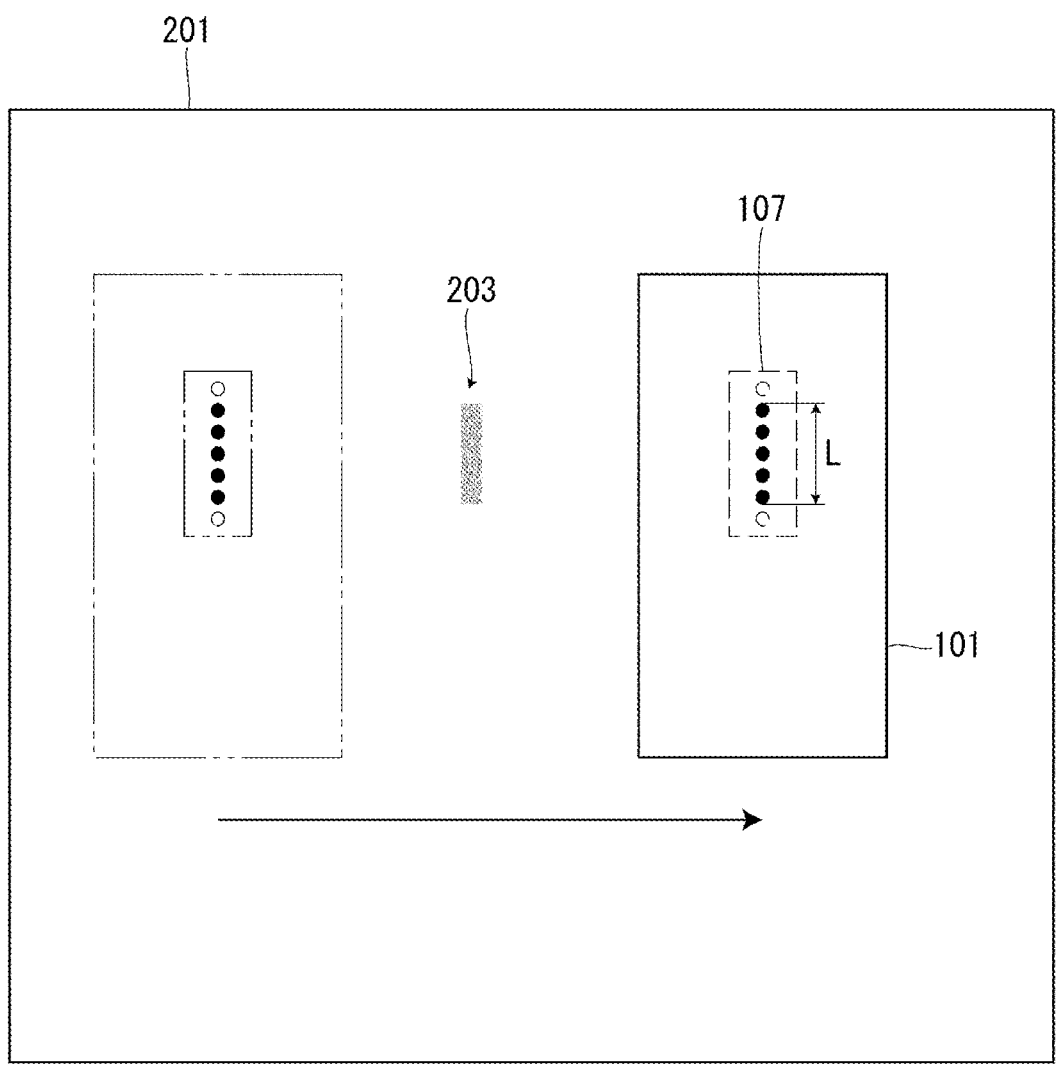
FIG. 8 is a diagram showing a state in which the printing device prints a reduced print image in one pass.

As explained above, the maximum size in the Y direction of the print image 203 that can be printed in one pass is substantially equal to the first nozzle row length L. Therefore, in order to print the print image 203, the size in the Y direction of which is larger than the first nozzle row length L, as shown in FIGS. 5 to 7, the printing device 101 needs to print the print image 203 separately in a plurality of passes. When the print image 203 is printed separately in the plurality of passes, the print images 203 printed in the respective passes are referred to as partial images 207. FIGS. 5 to 7 show a configuration in which, in the plurality of passes, movement of the printing device 101 in the +X direction and movement of the printing device 101 in the −X direction are alternately performed. However, the movement of the printing device 101 in the +X direction may be performed in any pass or the movement of the printing device 101 in the −X direction may be performed in any pass.

When the print image 203 is separately printed in the plurality of passes by the printing device 101, based on a measurement result of movement of the printing device 101 by the movement measuring section 109, the partial image 207 printed in a (m+1)-th pass is printed in a position corresponding to the partial image 207 printed in an m-th pass. However, it is likely that a plurality of partial images 207 printed in the plurality of passes overlap one another or gaps are formed among the plurality of partial images 207 because of a measurement error of the movement of the printing device 101 by the movement measuring section 109. In these cases, streaks 209 extending in the moving direction of the printing device 101, that is, the X direction occur on the print image 203. In an example shown in FIGS. 6 and 7, the streak 209 due to the overlap occur between a first partial image 207 and a second partial image 207 in the +Y direction and the streak 209 due to the gap occur between the second partial image 207 and a third partial image 207 in the +Y direction.

That is, the information processing device 1 in this embodiment can prevent the streaks 209 from occurring on the print image 203 by reducing the size of the print image 203 to cause the printing device 101 to print the print image 203 in one pass (see FIG. 8) instead of causing the printing device 101 to print the print image 203 separately in a plurality of passes.

Hardware Configuration of the Information Processing Device

Figure 9:
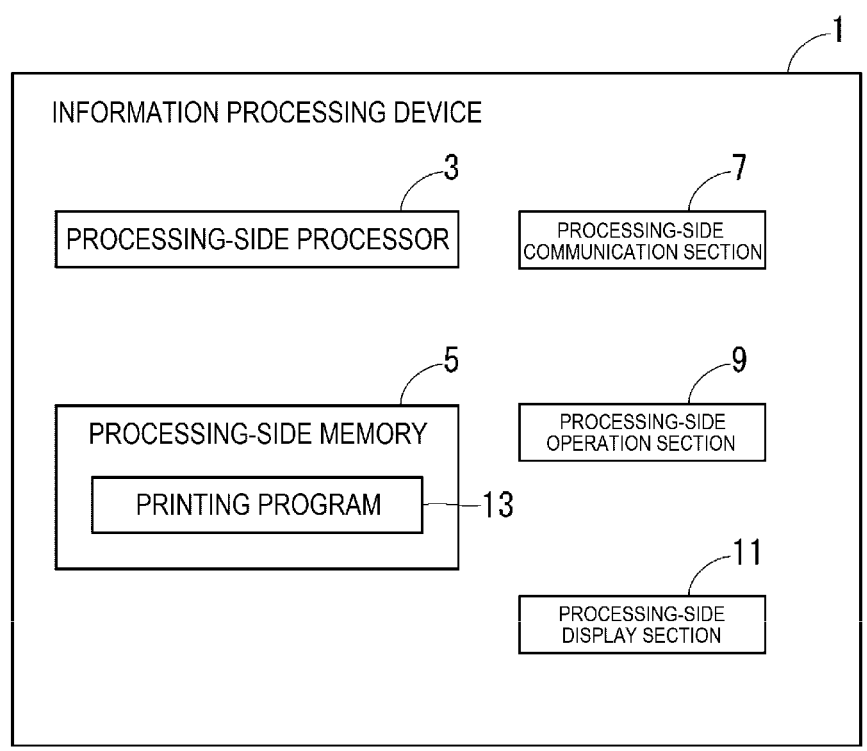
FIG. 9 is a block diagram showing a hardware configuration of an information processing device.

As shown in FIG. 9, the information processing device 1 includes a processing-side processor 3, a processing-side memory 5, a processing-side communication section 7, a processing-side operation section 9, and a processing-side display section 11.

The processing-side processor 3 executes various programs stored in the processing-side memory 5. The processing-side processor 3 is, for example, one or a plurality of CPUs (Central Processing Units). The processing-side processor 3 may be a hardware circuit such as an ASIC (Application Specific Integrated Circuit) or may have a configuration in which the one or more CPUs and the hardware circuit such as the ASIC perform processing in cooperation.

The processing-side memory 5 stores various programs and various data. The processing-side memory 5 includes, for example, a ROM (Read Only Memory), a RAM (Random Access Memory), and an EEPROM (Electrically Erasable Programmable Read-Only memory). The processing-side memory 5 may include a HDD (Hard Disk Drive) and an SSD (Solid State Drive).

The various programs stored in the processing-side memory 5 include a printing program 13. The printing program 13 is an application program corresponding to the printing device 101. The processing-side processor 3 executes the printing program 13 to thereby generate a printing job and transmits the generated printing job to the printing device 101.

The processing-side communication section 7 transmits and receives various data and various commands to and from the printing device 101. The processing-side communication section 7 includes a communication circuit that communicates with the printing device 101 by wire or radio.

The processing-side operation section 9 receives operation from the user. As the processing-side operation section 9, for example, a keyboard and a mouse can be used.

The processing-side display section 11 displays various screens. As the processing-side display section 11, for example, a liquid crystal display or an organic EL display (EL: Electro-Luminescence) can be used. The information processing device 1 may include a touch panel functioning as the processing-side operation section 9 and the processing-side display section 11.

Hardware Configuration of the Printing Device

Figure 10:
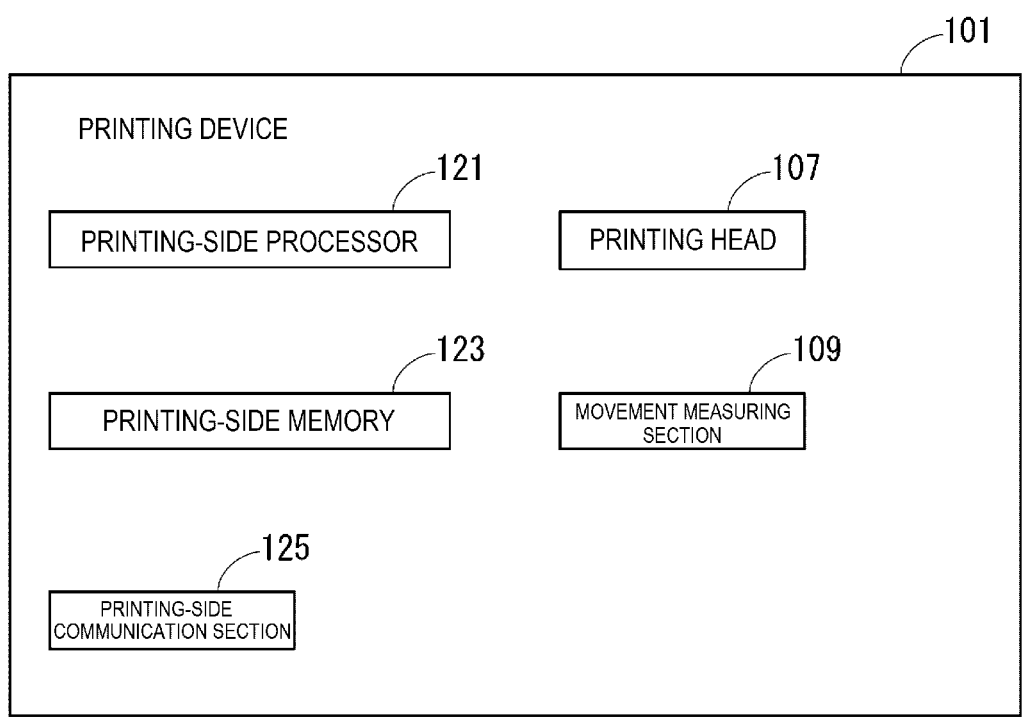
FIG. 10 is a block diagram showing a hardware configuration of the printing device.

As shown in FIG. 10, the printing device 101 includes a printing-side processor 121, a printing-side memory 123, a printing-side communication section 125, the printing head 107, and the movement measuring section 109.

The printing-side processor 121 executes various programs stored in the printing-side memory 123. The printing-side processor 121 is, for example, one or a plurality of CPUs. The printing-side processor 121 may be a hardware circuit such as an ASIC or may have a configuration in which the one or more CPUs and the hardware circuit such as the ASIC perform processing in cooperation.

The printing-side memory 123 stores various programs and various data. The printing-side memory 123 includes, for example, a ROM and a RAM. The printing-side memory 123 may include an EEPROM, a HDD, and an SSD.

The printing-side communication section 125 transmits and receives various data and various commands to and from the information processing device 1. The printing-side communication section 125 includes a communication circuit that communicates with the information processing device 1 by wire or radio.

Print Setting Screen

Figure 11:
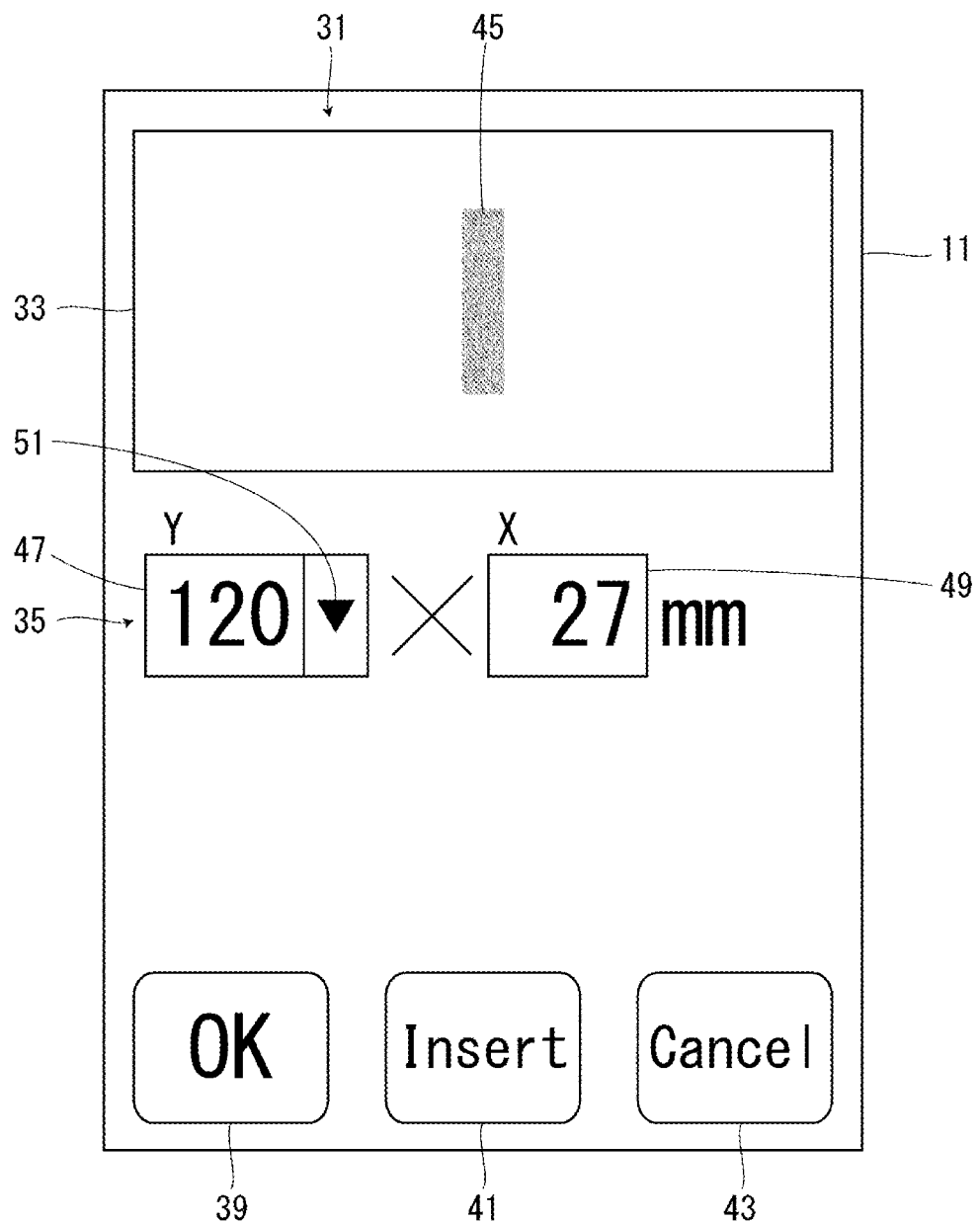
FIG. 11 is a diagram showing a print setting screen.

A print setting screen 31 displayed on the processing-side display section 11 is explained with reference to FIGS. 11 to 13. Predetermined operation is performed on an initial screen displayed after a start of the printing program 13, whereby the print setting screen 31 is displayed. On the print setting screen 31, a preview display region 33, a size display field 35, an OK button 39, an insertion button 41, and a cancel button 43 are displayed.

In the preview display region 33, a printing preview of a print candidate image 45 is displayed. The user can move the print candidate image 45 in the preview display region 33 by performing, for example, drag operation on the print candidate image 45 displayed in the preview display region 33. Consequently, when a plurality of print candidate images 45 are displayed in the preview display region 33, a positional relation among the plurality of print candidate images 45 can be changed.

In the size display field 35, a print plan size of the print image 203 to be printed is displayed based on image data of the print candidate image 45 displayed in the preview display region 33. In the size display field 35, the print plan size acquired from the image data of the print candidate image 45 is displayed in default. The size display field 35 includes a first display field 47 and a second display field 49. A print plan size in the Y direction is displayed in the first display field 47. A print plan size in the X direction is displayed in the second display field 49.

A list display mark 51 is provided in the first display field 47. When the list display mark 51 is operated, a pulldown list 53 is displayed near the first display field 47 (see FIG. 12). The pulldown list 53 includes a plurality of size choices 55.

The user can designate a desired print plan size in the Y direction instead of the print plan size in the Y direction displayed in the first display field 47 in default by selecting a desired size choice 55 out of the plurality of size choices 55 included in the pulldown list 53. The print plan size in the X direction displayed in the second display field 49 is automatically changed according to a print plan size in the Y direction after change such that an XY ratio of the print plan sizes is maintained. The XY ratio of the print plan sizes means a ratio of the print plan size in the Y direction and the print plan size in the X direction. For example, when "120" is displayed in the first display field 47 and "27" is displayed in the second display field 49 as a default print plan size as shown in FIG. 11 and the size choice 55 of "40" is selected as shown in FIG. 12, as shown in FIG. 13, the display of the first display field 47 is changed to "40" and the display of the second display field 49 is automatically changed to "9".

The print plan size in the X direction displayed in the second display field 49 is not limited to be automatically changed according to the print plan size in the Y direction after change and may be designated by the user independently from the print plan size in the Y direction. That is, the user may designate a desired print plan size in the X direction by selecting a desired size choice out of a plurality of size choices (not shown) displayed separately from the plurality of size choices 55 for designating the print plan size in the Y direction. In this case, the XY ratio of the print plan sizes can be changed.

Figure 12:
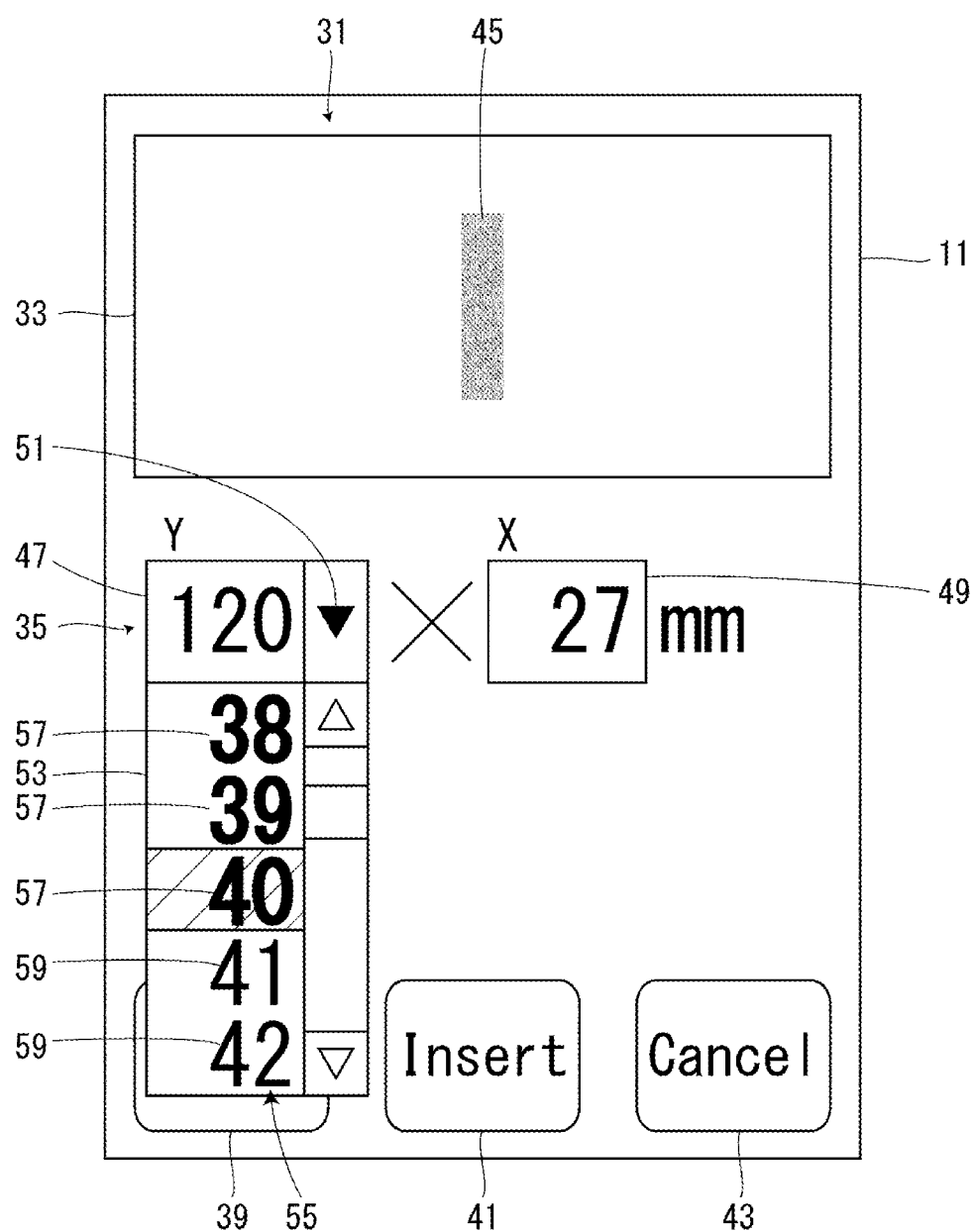
FIG. 12 is a diagram showing the print setting screen following FIG. 11.
Figure 13:
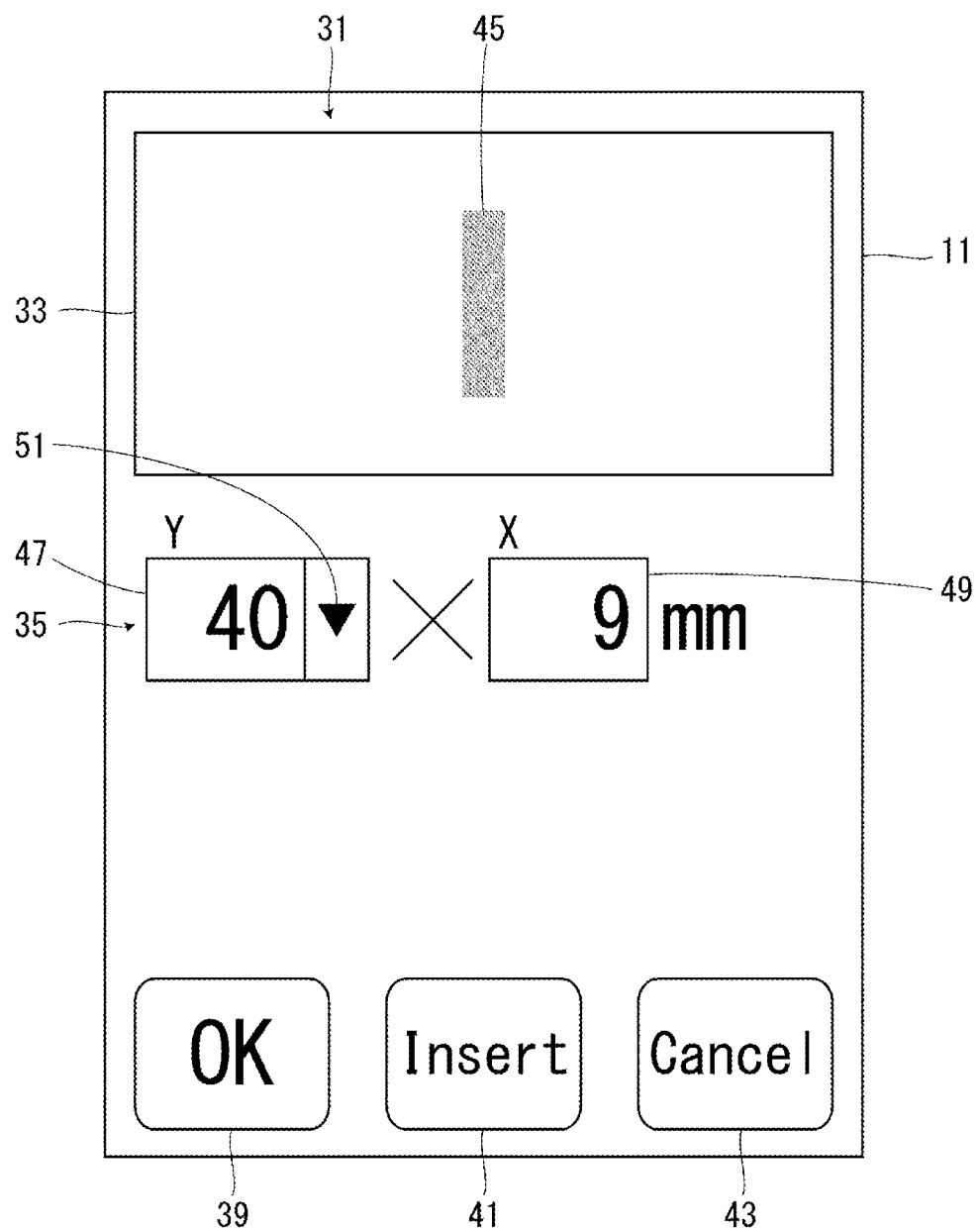
FIG. 13 is a diagram showing the print setting screen following FIG. 12.

As shown in FIG. 12, the plurality of size choices 55 includes a one-pass printable choice 57, which is a one-pass printable size, and a one-pass unprintable choice 59, which is not the one-pass printable size. The one-pass printable size means a size printable in one pass by the printing device 101. A size, which is not the one-pass printable size, is referred to as one-pass unprintable size as well. That is, among the plurality of size choices 55, the size choice 55 equal to or smaller than the first nozzle row length L is the one-pass printable choice 57 and the size choice 55 larger than the first nozzle row length L is the one-pass unprintable choice 59. Specifically, when the first nozzle row length L is, for example, 40 mm, among the plurality of size choices 55, the size choice 55 equal to or smaller than "40" mm is the one-pass printable choice 57 and the size choice 55 larger than "40" mm is the one-pass unprintable choice 59.

The one-pass printable choice 57 is displayed distinguishably from the one-pass unprintable choice 59. That is, the one-pass printable choice 57 is displayed in boldface and the one-pass unprintable choice 59 is displayed in a normal font. Since the one-pass printable choice 57 is displayed distinguishably from the one-pass unprintable choice 59 in this way, the one-pass printable size is notified to the user before the size choice 55 is selected. Consequently, the user can grasp which of the plurality of size choices 55 is the one-pass printable size, that is, which size choice 55 should be selected to print the print image 203 in one pass with the printing device 101.

A form of displaying the one-pass printable choice 57 distinguishably from the one-pass unprintable choice 59 is not limited to the form in which the one-pass printable choice 57 is displayed in boldface and the one-pass unprintable choice 59 is displayed in the normal font. For example, conversely, the one-pass printable choice 57 may be displayed in the normal font and the one-pass unprintable choice 59 may be displayed in boldface. Characters of the one-pass printable choice 57 and characters of the one-pass unprintable choice 59 may be displayed in different colors. A background of the one-pass printable choice 57 and a background of the one-pass unprintable choice 59 may be displayed in different colors. The one-pass printable choice 57 may be displayed in a field described as "one-pass printable size" and the one-pass unprintable choice 59 may be displayed in a field described as "one-pass unprintable size".

The OK button 39 receives operation for deciding selection and input on the print setting screen 31. When the OK button 39 is operated, the information processing device 1 generates a printing job based on the image data of the print candidate image 45 displayed in the preview display region 33 and transmits the generated printing job to the printing device 101.

The insertion button 41 receives operation for prompting the user to designate the print candidate image 45. When the insertion button 41 is operated, the information processing device 1 causes the processing-side display section 11 to display an image selection screen and causes the processing-side display section 11 to additionally display, in the preview display region 33, the print candidate image 45 selected on the image selection screen. The information processing device 1 adds, as a default size, a maximum size in which the print candidate image 45 can be printed in one pass. However, the information processing device 1 is not limited to this. The information processing device 1 may select, on the image selection screen, as the print candidate image 45, an image obtained by performing photographing using a photographing function of the information processing device 1. The information processing device 1 may select an image received from another device as the print candidate image 45. The information processing device 1 may prompt the user to input a character string and select an image of the input character string as the print candidate image 45.

The cancel button 43 receives operation for returning to the initial screen (not shown). When the cancel button 43 is operated, the information processing device 1 causes the processing-side display section 11 to display the initial screen.

Producing Method for a Print: First Embodiment

Figure 14:
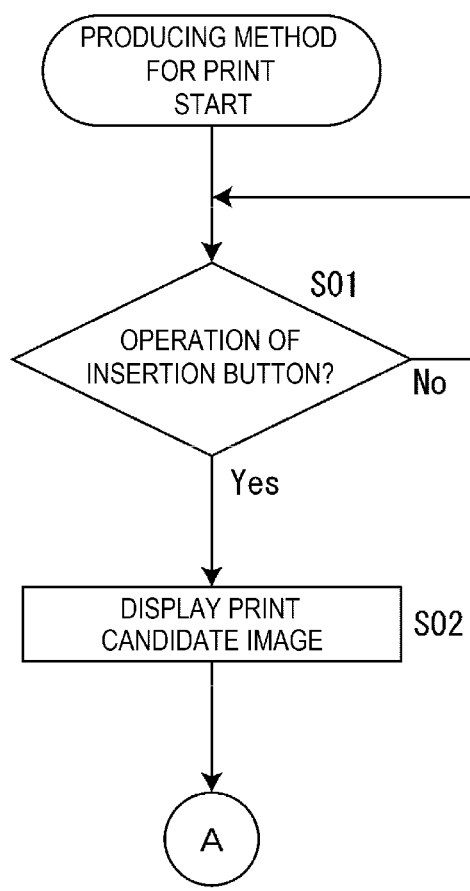
FIG. 14 is a flowchart showing a first embodiment of a producing method for a print.
Figure 15:
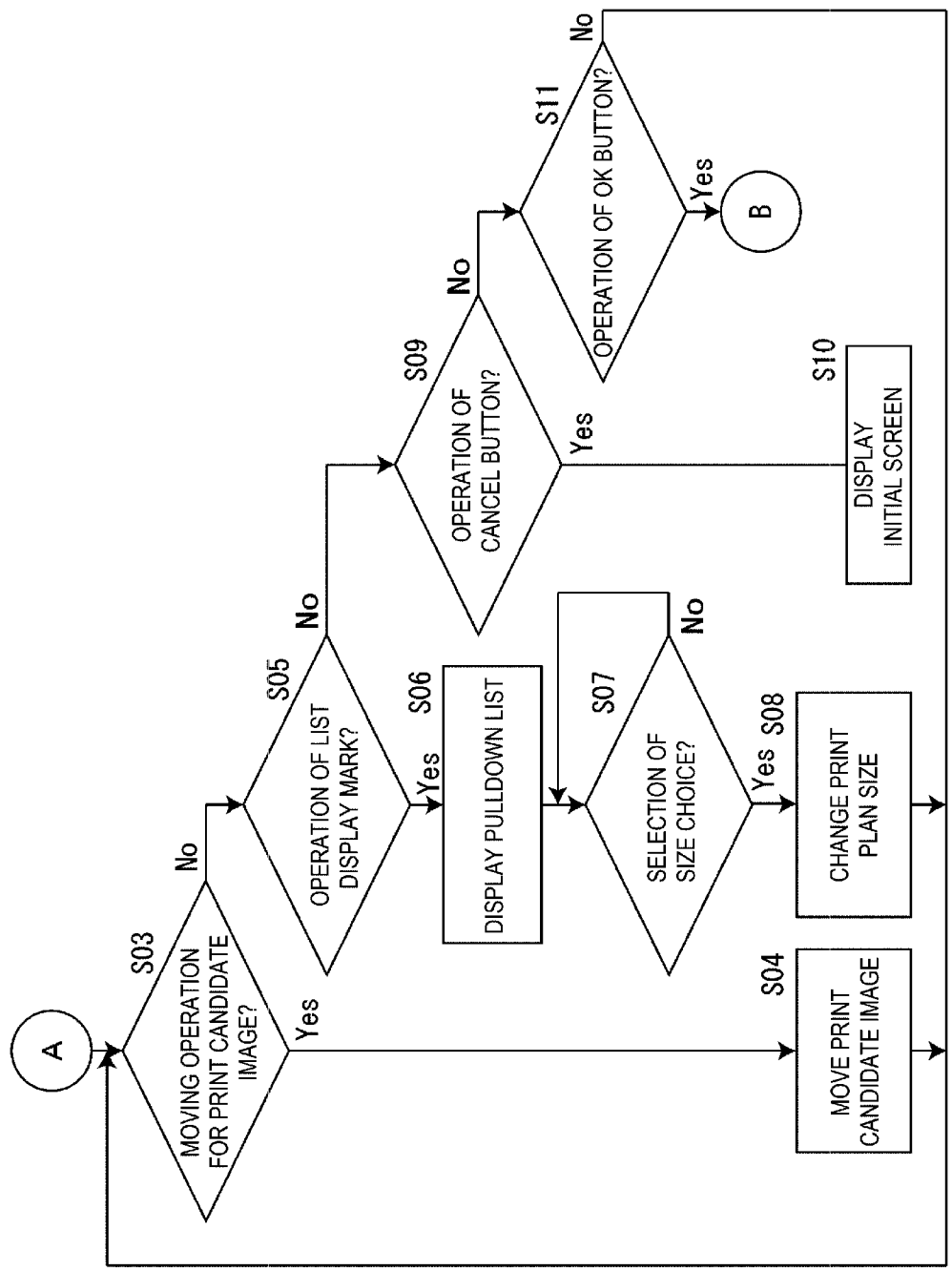
FIG. 15 is a flowchart following FIG. 14.
Figure 16:
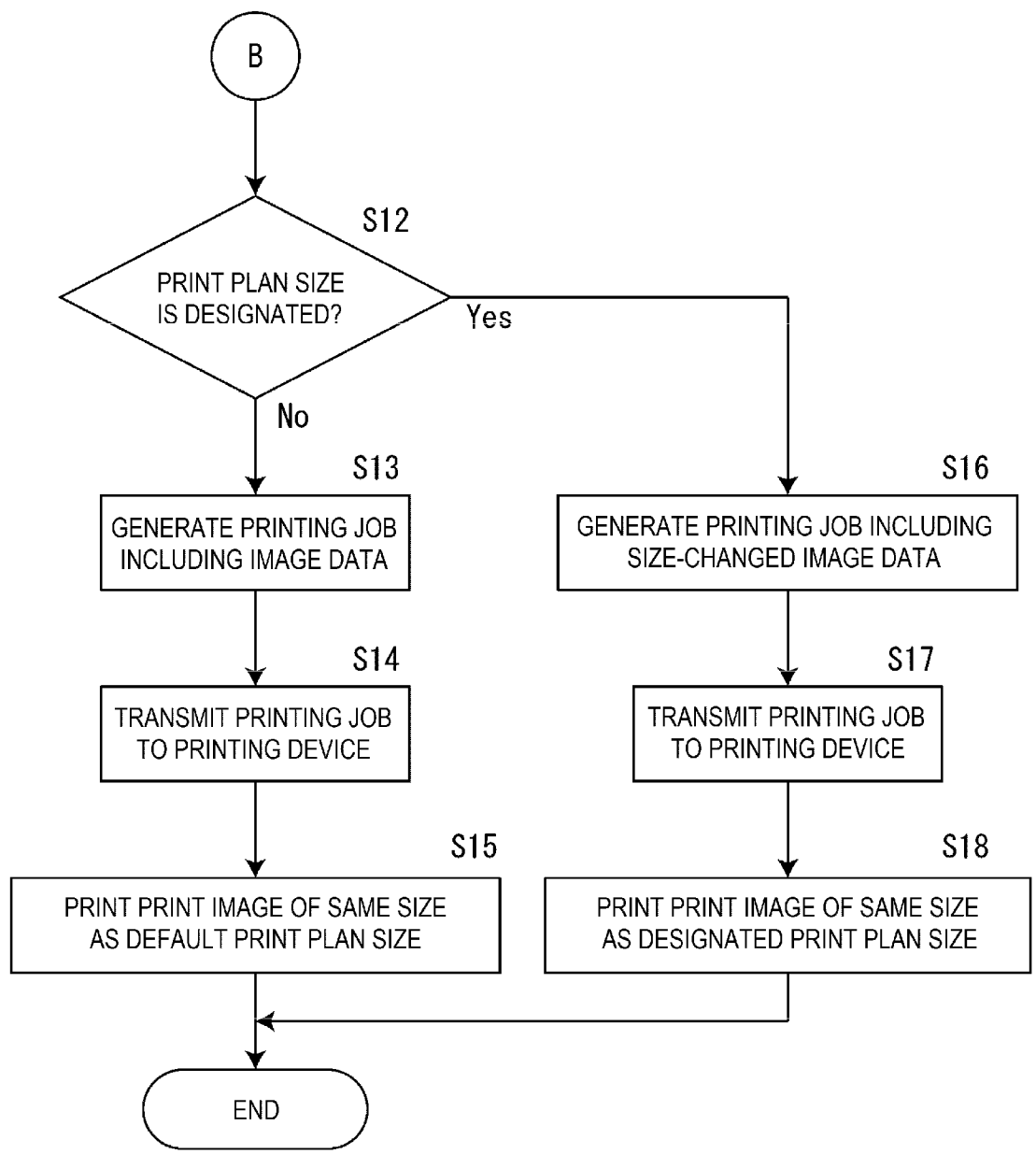
FIG. 16 is a flowchart following FIG. 15.

A first embodiment of a producing method for the print 205 executed by the printing system Sy is explained with reference to FIGS. 14 to 16.

In step S01, the information processing device 1 determines whether the insertion button 41 is operated on the print setting screen 31. When determining that the insertion button 41 is operated, the information processing device 1 proceeds to step S02. On the other hand, when determining that the insertion button 41 is not operated, the information processing device 1 repeats step S01 until determining that the insertion button 41 is operated.

In step S02, the information processing device 1 causes the processing-side display section 11 to display the image selection screen and causes the processing-side display section 11 to display, in the preview display region 33, the print candidate image 45 selected on the image selection screen. The information processing device 1 causes the processing-side display section 11 to display, in the size display field 35, a print plan size of the print image 203 to be printed based on image data of the selected print candidate image 45. The information processing device 1 acquires the print plan size of the print image 203 from the image data of the print candidate image 45.

In step S03, the information processing device 1 determines whether moving operation for the print candidate image 45 displayed in the preview display region 33 is performed. When determining that moving operation for the print candidate image 45 displayed in the preview display region 33 is performed, the information processing device 1 proceeds to step S04.

In step S04, the information processing device 1 moves the print candidate image 45 in the preview image region 33 based on the moving operation for the print candidate image 45. Thereafter, the information processing device 1 returns to step S03.

On the other hand, when determining in step S03 that moving operation for the print candidate image 45 displayed in the preview display region 33 is not performed, the information processing device 1 proceeds to step S05.

In step S05, the information processing device 1 determines whether operation for the list display mark 5 is performed. When determining that operation for the list display mark 51 is performed, the information processing device 1 proceeds to step S06.

In step S06, the information processing device 1 displays the pulldown list 53. In the pulldown list 53, the one-pass printable choice 57 is displayed distinguishably from the one-pass unprintable choice 59. Consequently, the information processing device 1 notifies the one-pass printable size to the user.

In step S07, the information processing device 1 determines whether operation for selecting one size choice 55 from the plurality of size choices 55 included in the pulldown list 53 is performed. When determining that operation for selecting the size choice 55 is performed, the information processing device 1 proceeds to step S08. On the other hand, when determining that operation for selecting the size choice 55 is not performed, the information processing device 1 repeats step S07 until determining that operation for selecting the size choice 55 is performed.

In step S08, the information processing device 1 updates, based on the operation for selecting the size choice 55, the print plan size displayed in the size display field 35. Consequently, the print plan size of the print image 203 is designated by the user. Thereafter, the information processing device 1 returns to step S03.

On the other hand, when determining in step S05 that operation for the list display mark 51 is not performed, the information processing device 1 proceeds to step S09.

In step S09, the information processing device 1 determines whether operation for the cancel button 43 is performed. When determining that operation for the cancel button 43 is performed, the information processing device 1 proceeds to step S10.

In step S10, the information processing device 1 causes the processing-side display section 11 to display the initial screen. That is, the information processing device 1 switches the display of the processing-side display section 11 from the print setting screen 31 to the initial screen.

On the other hand, when determining in step S09 that operation for the cancel button 43 is not performed, the information processing device 1 proceeds to step S11.

In step S11, the information processing device 1 determines whether operation for the OK button 39 is performed. When determining that operation for the OK button 39 is performed, the information processing device 1 regards that setting concerning printing including a print plan size is decided and proceeds to step S12.

On the other hand, when determining in step S11 that operation for the OK button 39 is not performed, the information processing device 1 returns to step S03.

In step S12, the information processing device 1 determines whether a print plan size different from the default print plan size is designated by the user. When the default print plan size is updated in step S08, the information processing device 1 determines that a print plan size is designated by the user. On the other hand, when step S08 is not executed and the default print plan size is maintained, the information processing device 1 determines that a print plan size is not designated by the user. When the size choice 55 same as the default print plan size is selected, the print plan size is not updated. The information processing device 1 determines that a print plan size is not designated. When determining that a print plan size is not designated by the user, the information processing device 1 proceeds to step S13.

In step S13, the information processing device 1 generates a printing job including the image data of the print candidate image 45.

In step S14, the information processing device 1 transmits the generated printing job to the printing device 101.

In step S15, the printing device 101 prints, based on the image data included in the received printing job, the print image 203 of the same size as the default print plan size. At this time, when the default print plan size is not the one-pass printable size, the printing device 101 prints the print image 203 separately in a plurality of passes (see FIGS. 5 to 7). When the default print plan size is the one-pass printable size, the printing device 101 prints the print image 203 in one pass (see FIG. 8).

On the other hand, when determining in step S12 that a print plan size is designated by the user, the information processing device 1 proceeds to step S16.

In step S16, the information processing device 1 enlarges or reduces the image data of the print candidate image 45 based on the designated print plan size to generate size-changed image data and generates a printing job including the generated size-changed image data. That is, when the designated print plan size is larger than the default print plan size, the information processing device 1 enlarges the image data of the print candidate image 45 to generate the size-changed image data. When the designated print plan size is smaller than the default print plan size, the information processing device 1 reduces the image data of the print candidate image 45 to generate the size-changed image data.

In step S17, the information processing device 1 transmits the generated printing job to the printing device 101.

In step S18, the printing device 101 prints, based on the size-changed image data included in the received printing job, the print image 203 of the same size as the designated print plan size. At this time, when the designated print plan size is not the one-pass printable size, the printing device 101 prints the print image 203 separately in a plurality of passes (see FIGS. 5 to 7). When the designated print plan size is the one-pass printable size, the printing device 101 can print the print image 203 in one pass (see FIG. 8).

As explained above, according to the first embodiment of the producing method for the print 205, when desiring to print the print image 203 having high quality, the user can designate the one-pass printable size as the print plan size based on the notification of the one-pass printable size. That is, the user only has to select the one-pass printable choice 57 out of the plurality of size choices 55 displayed in the pulldown list 53. When the one-pass printable size is designated as the print plan size, the printing device 101 can print, in one pass, the print image 203 of the same size as the designated print plan size. Therefore, it is possible to prevent the streaks 209 from occurring on the print image 203 because the print image 203 is printed separately in a plurality of passes. Accordingly, it is possible to produce the print 205 having high quality. When desiring to print the print image 203 in a large size even if the quality of the print image 203 is low, the user only has to select the one-pass unprintable choice 59 out of the plurality of size choices 55 displayed in the pulldown list 53.

Functional Configuration of the Processing-Side Processor

Figure 17:
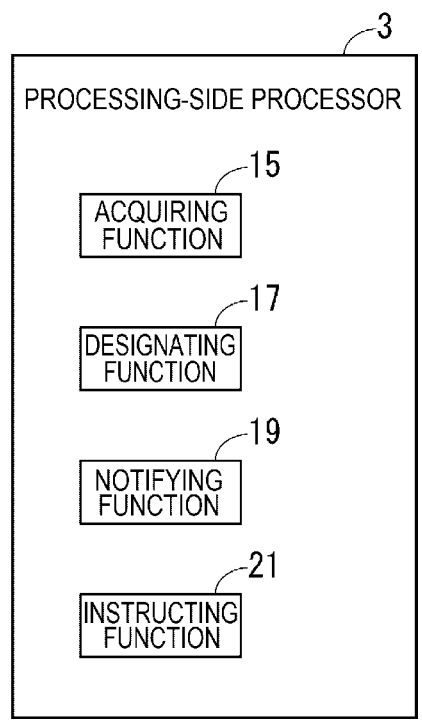
FIG. 17 is a diagram showing a functional configuration of a processing-side processor.

A functional configuration of the processing-side processor 3 is explained with reference to FIG. 17. The processing-side processor 3 includes an acquiring function 15, a designating function 17, a notifying function 19, and an instructing function 21. These functions are realized by the processing-side processor 3 executing the printing program 13.

The acquiring function 15 acquires image data for the printing device 101 to print the print image 203. That is, the acquiring function 15 acquires the image data of the print candidate image 45 selected on the image selection screen.

The designating function 17 prompts the user to designate a print plan size of the print image 203. That is, the designating function 17 prompts the user to select one size choice 55 out of the plurality of size choices 55 displayed on the processing-side display section 11 to thereby prompt the user to designate a print plan size of the print image 203.

The notifying function 19 notifies the one-pass printable size to the user before a print plan size is designated. That is, the notifying function 19 causes the processing-side display section 11 to display, among the plurality of size choices 55, the one-pass printable choice 57 to be distinguished from the one-pass printable choice 59 to notify the one-pass printable size to the user.

The instructing function 21 instructs the printing device 101 to print the print image 203 in the designated print plan size. That is, the instructing function 21 generates size-changed image data obtained by enlarging or reducing the image data based on the designated print plan size and transmits the generated size-changed image data to the printing device 101 to instruct the printing device 101 to print the print image 203 in the designated print plan size.

Producing Method for the Print: Second Embodiment

A second embodiment of the producing method for the print 205 executed by the printing system Sy is explained. The second embodiment is different from the first embodiment in that, instead of the information processing device 1, the printing device 101 notifies the one-pass printable size to the user. Explanation about the similarities to the first embodiment is omitted.

Figure 18:
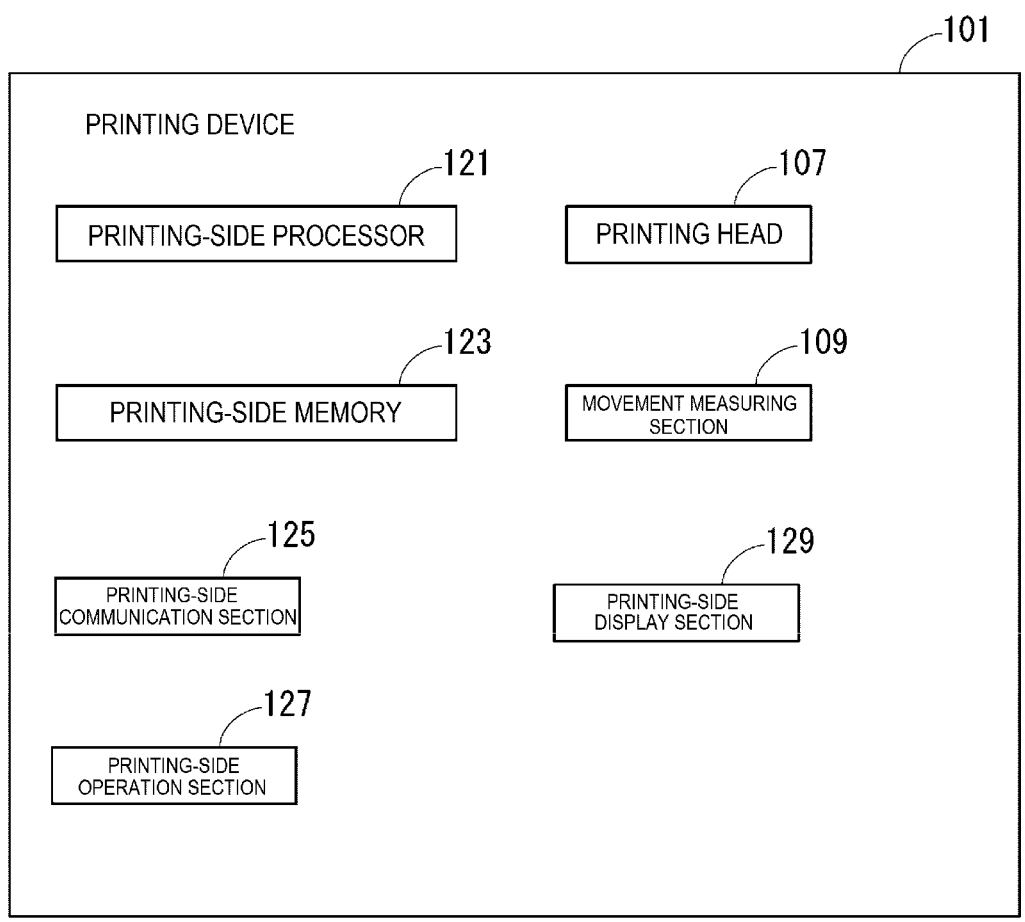
FIG. 18 is a block diagram showing a hardware configuration of a printing device in a second embodiment.

As shown in FIG. 18, in the second embodiment, the printing device 101 includes a printing-side operation section 127 and a printing-side display section 129. The printing-side operation section 127 receives operation from the user. The printing-side display section 129 displays various screens. The printing device 101 may include a touch panel functioning as the printing-side operation section 127 and the printing-side display section 129.

On the printing-side display section 129, the print setting screen 31 is displayed in the same manner as being displayed on the processing-side display section 11 in the first embodiment. For example, on the print setting screen 31 of the printing-side display section 129, the one-pass printable choice 57 is displayed distinguishably from the one-pass unprintable choice 59.

Figure 19:
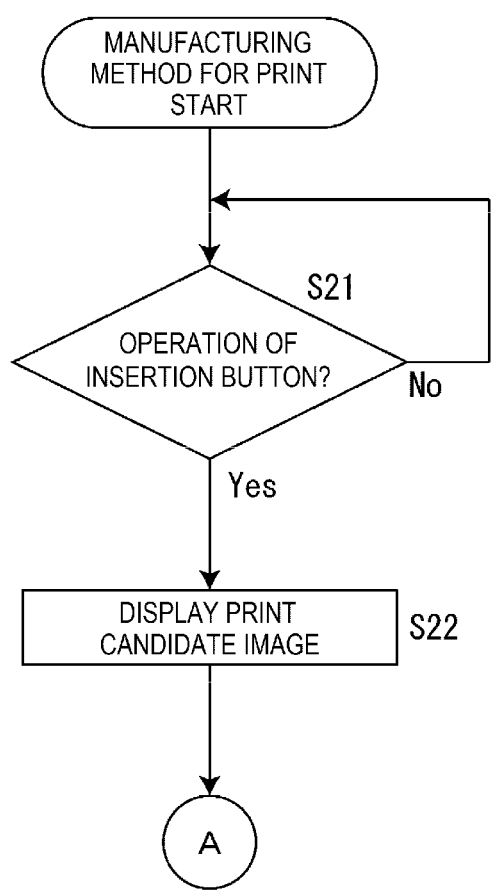
FIG. 19 is a flowchart showing a second embodiment of the producing method for a print.
Figure 20:
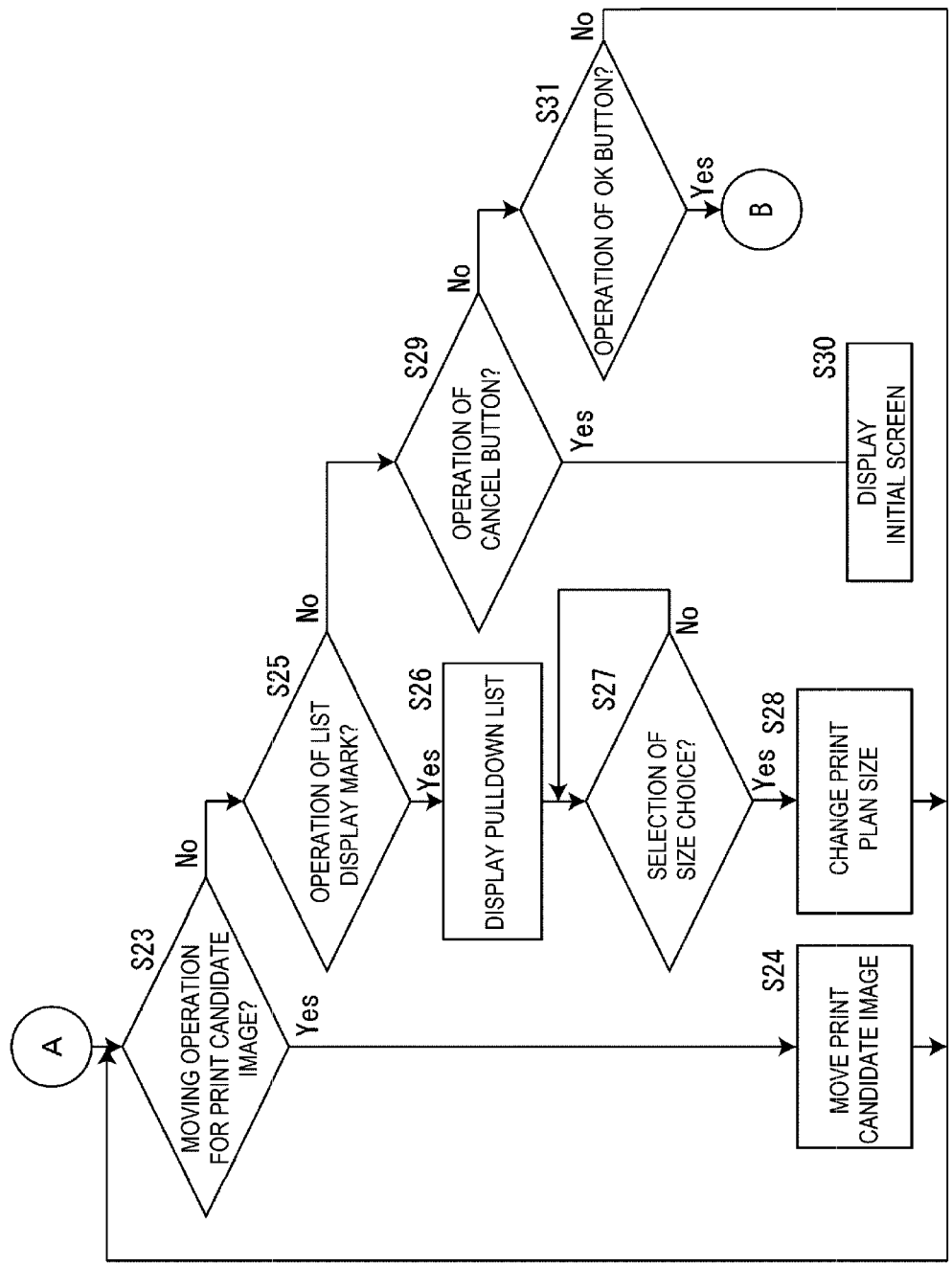
FIG. 20 is a flowchart following FIG. 19.
Figure 21:
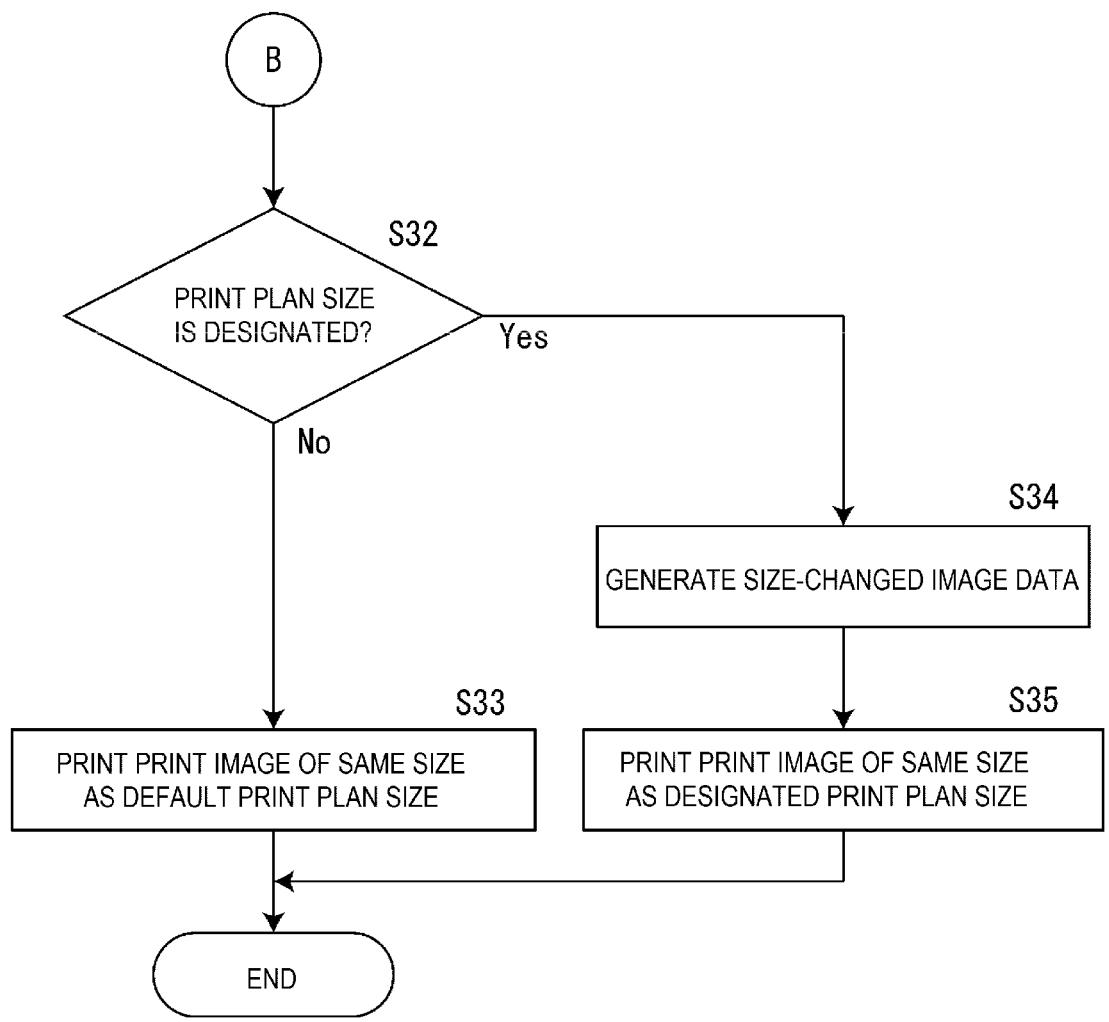
FIG. 21 is a flowchart following FIG. 20.

As shown in FIGS. 19 to 21, the printing device 101 executes steps S21 to S32 in the same manner as the information processing device 1 executing steps S01 to S12. For example, when determining in step S27 that selection operation for the size choice 55 is performed by the printing-side operation section 127 on the print setting screen 31 displayed on the printing-side display section 129, the printing device 101 proceeds to step S28. In step S28, the printing device 101 updates, on the print setting screen 31 displayed on the printing-side display section 129, based on the selection operation for the size choice 55, the print plan size displayed in the size display field 35. Consequently, a print plan size of the print image 203 is designated by the user. In step S32, the printing device 101 determines whether a print plan size is designated by the user. When determining that a print plan size is not designated by the user, the printing device 101 proceeds to step S33.

In step S33, the printing device 101 prints, based on the image data of the print candidate image 45, the print image 203 of the same size as the default print plan size on the medium 201. At this time, when the default print plan size is not the one-pass printable size, the printing device 101 prints the print image 203 separately in a plurality of passes (see FIGS. 5 to 7). When the default print plan size is the one-pass printable size, the printing device 101 prints the print image 203 in one pass (see FIG. 8).

On the other hand, when determining in step S32 that a print plan size is designated by the user, the printing device 101 proceeds to step S34.

In step S34, the printing device 101 enlarges or reduces the image data of the print candidate image 45 based on the designated print plan size to generate size-changed image data.

In step S35, the printing device 101 prints, based on the generated size-changed image data, the print image 203 of the same size as the designated print plan size. At this time, when the designated print plan size is not the one-pass printable size, the printing device 101 prints the print image 203 separately in a plurality of passes (see FIGS. 5 to 7). When the designated print plan size is the one-pass printable size, the printing device 101 prints the print image 203 in one pass (see FIG. 8).

As explained above, according to the second embodiment of the producing method for the print 205, as in the first embodiment, when desiring to print the print image 203 in one pass, the user can designate the one-pass printable size as the print plan size based on the notification of the one-pass printable size. When the one-pass printable size is designated as the print plan size, the printing device 101 prints, in one pass, the print image 203 of the same size as the designated print plan size. Therefore, it is possible to prevent the streaks 209 from occurring on the print image 203 because the print image 203 is printed separately in a plurality of passes. Accordingly, it is possible to produce the print 205 having high quality.

Other Modifications

The present disclosure is not limited to the embodiments explained above. It goes without saying that various configurations are adaptable without departing from the gist of the present disclosure. The structure and contents of the screen of the printing device 101 are not limited to the embodiments. For example, the embodiments can be changed to the following modes besides the above description. The embodiments and modifications may be respectively combined.

Figure 22:
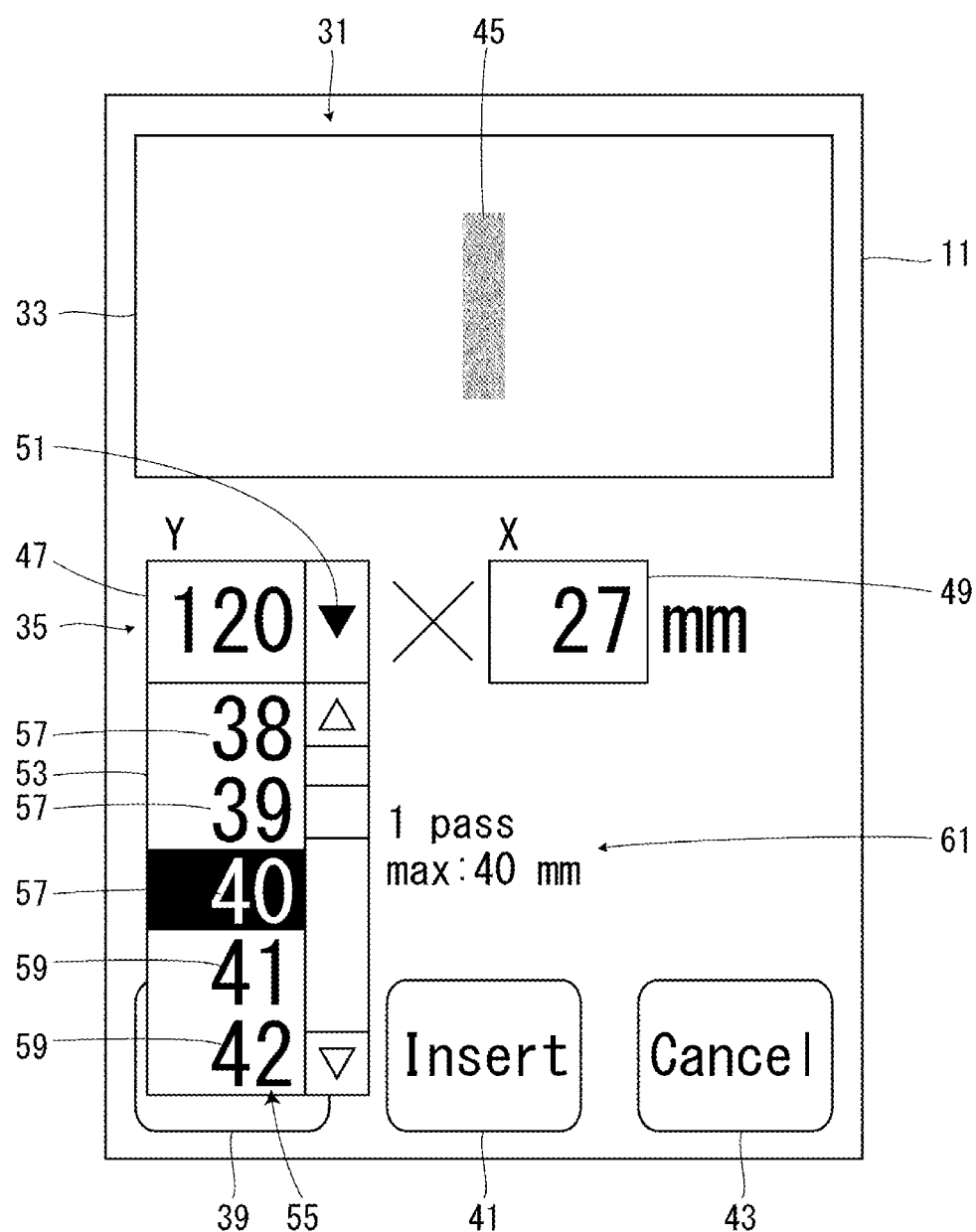
FIG. 22 is a diagram showing a modification of the print setting screen.

The information processing device 1 is not limited to the configuration for causing the processing-side display section 11 to display, among the plurality of size choices 55, the one-pass printable choice 57 to be distinguished from the one-pass unprintable choice 59 to notify the one-pass printable size to the user. The information processing device 1 may have a configuration for notifying the one-pass printable size to the user with other forms. For example, the information processing device 1 may notify the one-pass printable size to the user by displaying a display message 61 indicating the one-pass printable size on the print setting screen 31 as shown in FIG. 22. In this case, the information processing device 1 may prompt the user to designate a print plan size with, for example, a software keyboard (not shown) displayed on the processing-side display section 11 together with the print setting screen 31 instead of prompting the user to designate a print plan size by selecting the size choice 55. Further, for example, when the list display mark 51 is operated, the information processing device 1 may notify the one-pass printable size to the user by outputting a sound message indicating the one-pass printable size from a speaker (not shown). These modifications are also applicable when the printing device 101 notifies the one-pass unprintable size to the user to indirectly notify the one-pass printable size to the user. According to a change of an input size between the one-pass unprintable size and the one-pass printable size, the information processing device 1 may notify the change of the size. For example, on a print setting screen on which an up-down key is operated to increase or reduce a size one by one, when the size is increased from a maximum size of the one-pass printable size by one, "printing will be unable to be performed in one pass" may be displayed or notified by sound or, when the size is reduced from a minimum size of the one-pass unprintable size by one, "printing will be able to performed in one pass" may be displayed or notified by sound.

The information processing device 1 is not limited to the configuration for transmitting the size-changed image data to the printing device 101 to instruct the printing device 101 to print the print image 203 in the designated print plan size. The information processing device 1 may have a configuration for, for example, transmitting image data not enlarged or reduced and the designated print plan size to the printing device 101 to instruct the printing device 101 to print the print image 203 in the designated print plan size. In this case, the printing device 101 enlarges or reduces the received image data based on the received print plan size to generate size-changed image data and prints, based on the generated size-changed image data, the print image 203 of the same size as the designated print plan size on the medium 201.

The printing head 107 is not limited to the inkjet head and may be, for example, a thermal head that performs printing in a thermal transfer scheme.

NOTES

A printing program and a producing method for a print are noted below.

A printing program causes a computer to realize: a designating function for prompting a user to designate a print plan size of a print image; an instructing function for instructing a printing device, which is manually moved with respect to a medium to perform printing on the medium, to print the print image in the designated print plan size; and a notifying function for notifying a one-pass printable size, which is a size of the print image printable in one pass by the printing device, to the user before the print plan size is designated.

With this configuration, when desiring to print the print image in one pass, the user can designate the one-pass printable size as the print plan size based on the notification of the one-pass printable size. The printing device prints, in one pass, the print image of the same size as the designated print plan size. Therefore, it is possible to prevent streaks from occurring on the print image because the print image is printed separately in a plurality of passes.

The processing-side processor 3 is an example of the "computer".

In this case, it is preferable that, by prompting the user to select, out of a plurality of size choices displayed on a display section, one of the size choices, the designating function prompts the user to designate the print plan size, the plurality of size choices include a one-pass printable choice, which is the one-pass printable size, and a one-pass unprintable choice, which is not the one-pass printable choice, and the notifying function causes the display section to display, among the plurality of size choices, the one-pass printable choice to be distinguished from the one-pass unprintable choice to notify the one-pass printable size to the user.

With this configuration, it is possible to prompt the user to grasp which one of the plurality of size choices is the print plan size.

The processing-side display section 11 is an example of the "display section".

In this case, it is preferable that the computer program causes the computer to realize an acquiring function for acquiring image data for the printing device to print the print image, and the instructing function generates size-changed image data obtained by enlarging or reducing the image data based on the designated print plan size and transmits the generated size-changed image data to the printing device to print the print image in the designated print plan size.

With this configuration, by transmitting the size-changed image data obtained by enlarging or reducing the image data based on the print plan size to the printing device, it is possible to cause the printing device to print the print image in the designated print plan size.

A producing method for a print is a producing method for a print by a printing system including a printing device that is manually moved with respect to a medium to perform printing on the medium, the producing method including: causing the printing system to prompt a user to designate a print plan size of a print image; causing the printing device to print the print image in the print plan size; and causing the printing system to notify a one-pass printable size, which is a size of the print image printable in one pass by the printing device, to the user before the print plan size is designated.

With this configuration, when desiring to print the print image in one pass, the user can designate the one-pass printable size as the print plan size based on the notification of the one-pass printable size. The printing device prints, in one pass, the print image of the same size as the designated print plan size. Therefore, it is possible to prevent streaks from occurring on the print image because the print image is printed separately in a plurality of passes.

What is claimed is:

1. A non-transitory computer-readable storage medium storing a printing program for causing a computer to realize:
    a designating function for prompting a user to designate a print plan size of a print image;
    an instructing function for instructing a printing device, which is manually moved with respect to a medium to perform printing on the medium, to print the print image in the designated print plan size; and
    a notifying function for notifying a one-pass printable size, which is a size of the print image printable in one pass by the printing device, to the user before the print plan size is decided.

2. The non-transitory computer-readable storage medium according to claim 1, wherein
    by prompting the user to select, out of a plurality of size choices displayed on a display section, one of the size choices, the designating function prompts the user to designate the print plan size,
    the plurality of size choices include a one-pass printable choice, which is the one-pass printable size, and a one-pass unprintable choice, which is not the one-pass printable choice, and the notifying function causes the display section to display, among the plurality of size choices, the one-pass printable choice to be distinguished from the one-pass unprintable choice to notify the one-pass printable size to the user.

3. The non-transitory computer-readable storage medium according to claim 1, wherein the notifying function performs the notification according to a new designation of a one-pass unprintable size, which is a size of the print image unprintable in the one pass by the printing device, in a state in which the one-pass printable size is designated.

4. The non-transitory computer-readable storage medium according to claim 1, wherein the notifying function performs the notification according to a new designation of the one-pass printable size in a state in which a one-pass unprintable size, which is a size of the print image unprintable in the one pass by the printing device, is designated.

5. The non-transitory computer-readable storage medium according to claim 1, wherein the printing program further causes the computer to realize an acquiring function for acquiring image data for the printing device to print the print image, and the instructing function generates size-changed image data obtained by enlarging or reducing the image data based on the designated print plan size and transmits the generated size-changed image data to the printing device to print the print image in the designated print plan size.

6. A producing method for producing a print by a printing system including a printing device that is manually moved with respect to a medium to perform printing on the medium, the producing method comprising:

causing the printing system to prompt a user to designate a print plan size of a print image;

causing the printing device to print the print image in the print plan size; and causing the printing system to notify a one-pass printable size, which is a size of the print image printable in one pass by the printing device, to the user before the print plan size is decided.

\* \* \* \* \*